US007878691B2

(12) United States Patent
Liang

(10) Patent No.: US 7,878,691 B2
(45) Date of Patent: Feb. 1, 2011

(54) LED ROAD LAMP

(75) Inventor: Chien-Kuo Liang, Chung-Ho (TW)

(73) Assignee: Aeon Lighting Technology Inc., Chung-Ho, Taipei County (TW)

( * ) Notice: Subject to any disclaimer, the term of this patent is extended or adjusted under 35 U.S.C. 154(b) by 9 days.

(21) Appl. No.: 11/896,733

(22) Filed: Sep. 5, 2007

(65) Prior Publication Data

US 2010/0214775 A1 Aug. 26, 2010

(51) Int. Cl.
*B60Q 1/06* (2006.01)
*F21V 29/00* (2006.01)

(52) U.S. Cl. .................. 362/373; 362/249.02; 362/294; 362/153; 362/153.1; 362/267

(58) Field of Classification Search ................. 362/294, 362/373, 249.02, 267, 153, 153.1
See application file for complete search history.

(56) References Cited

U.S. PATENT DOCUMENTS 7,217,022 B2 * 5/2007 Ruffin ........................ 362/554
2007/0081340 A1 * 4/2007 Chung et al. ................ 362/294
2008/0025023 A1 * 1/2008 Hsieh et al. ................. 362/249

* cited by examiner

*Primary Examiner*—Stephen F Husar
*Assistant Examiner*—James W Cranson
(74) *Attorney, Agent, or Firm*—Jackson IPG PLLC; Demian K. Jackson

(57) ABSTRACT

An LED road lamp includes a heat dissipater module containing circuit boards, LED chips, and a cooling fin seat; and a completely sealed power supply. By directly using the cooling fin seat as an outer cover of a road lamp to contact with atmosphere for cooling, and directly transmitting heat from the LED chips and the circuit boards to a stand pipe, a dual cooling effect is achieved. Heat of the power supply is dissipated from the stand pipe through its sealed outer casing, to largely increase cooling area, lower temperature, and increase a cooling efficiency, preventing the power supply from being affected by ambient weather. Therefore, lifetimes of usage of the LED circuit boards, the LED chips, and the power supply are prolonged, the circuit boards are quickly assembled on and disassembled from a cooling base, and convenience in assembling and disassembling the circuit boards is improved.

12 Claims, 11 Drawing Sheets

LED ROAD LAMP

BACKGROUND OF THE INVENTION a) Field of the Invention

The present invention relates to an LED (Light Emitting Diode) road lamp, and more particularly to an LED road lamp which uses a cooling fin seat as an outer cover of a road lamp, with the cooling fin seat being directly exposed in atmosphere and being directly in contact with atmosphere, so as to achieve a better heat dissipation effect and to prolong a lifetime of usage of LED chips.

b) Description of the Prior Art

A typical conventional LED road lamp is disclosed in a Taiwan New Utility Model No. M303333, "Assembly Structure of an LED Road Lamp and a Heat Dissipation Module." In that model, an upper cover plate should be used to cover a heat conduction plate. However, as a cooling space of the heat conduction plate is limited, it is not able to contact with atmosphere, which allows heat to be accumulated in an interior of the upper cover plate, thereby being unable to quickly dissipate the heat. Moreover, as a heat pipe is vertically transfixed into a spacer plate and the heat conduction plate, the heat pipe is only provided with a shorter position to serve as a hot end, and only the hot end is in touch with a surface of an isothermal plate. As the hot end is provided with shorter length, smaller area and volume to receive heat, temperature at which the heat is conducted from the heat pipe to the heat conduction plate will be limited; therefore, it will not be able to achieve an object of high-efficiency heat dissipation in a short time, and hence a lifetime of usage of an LED lamp set cannot be increased effectively.

SUMMARY OF THE INVENTION

The primary object of the present invention is to provide an LED road lamp which uses a cooling fin seat as an outer cover, which is directly exposed in atmosphere and is directly in contact with atmosphere, so as to achieve a better heat dissipation effect and to prolong a lifetime of usage of circuit boards and LED chips.

Another object of the present invention is to provide an LED road lamp which uses a completely sealed power supply, such that the power supply will not be affected by ambient weather, and its lifetime of usage can be increased by forming a heat dissipation plate on an outer casing of the power supply.

Still another object of the present invention is to provide an LED road lamp, which uses a U-shape heat pipe, with its right straight tube being connected to a bottom surface of a circuit board, and its left straight tube being connected to a cooling fin seat, so as to effectively conduct heat on a surface of the circuit board through the U-shape heat pipe.

To enable a further understanding of the said objectives and the technological methods of the invention herein, the brief description of the drawings below is followed by the detailed description of the preferred embodiments.

DETAILED DESCRIPTION OF THE PREFERRED EMBODIMENTS

Figure 1:
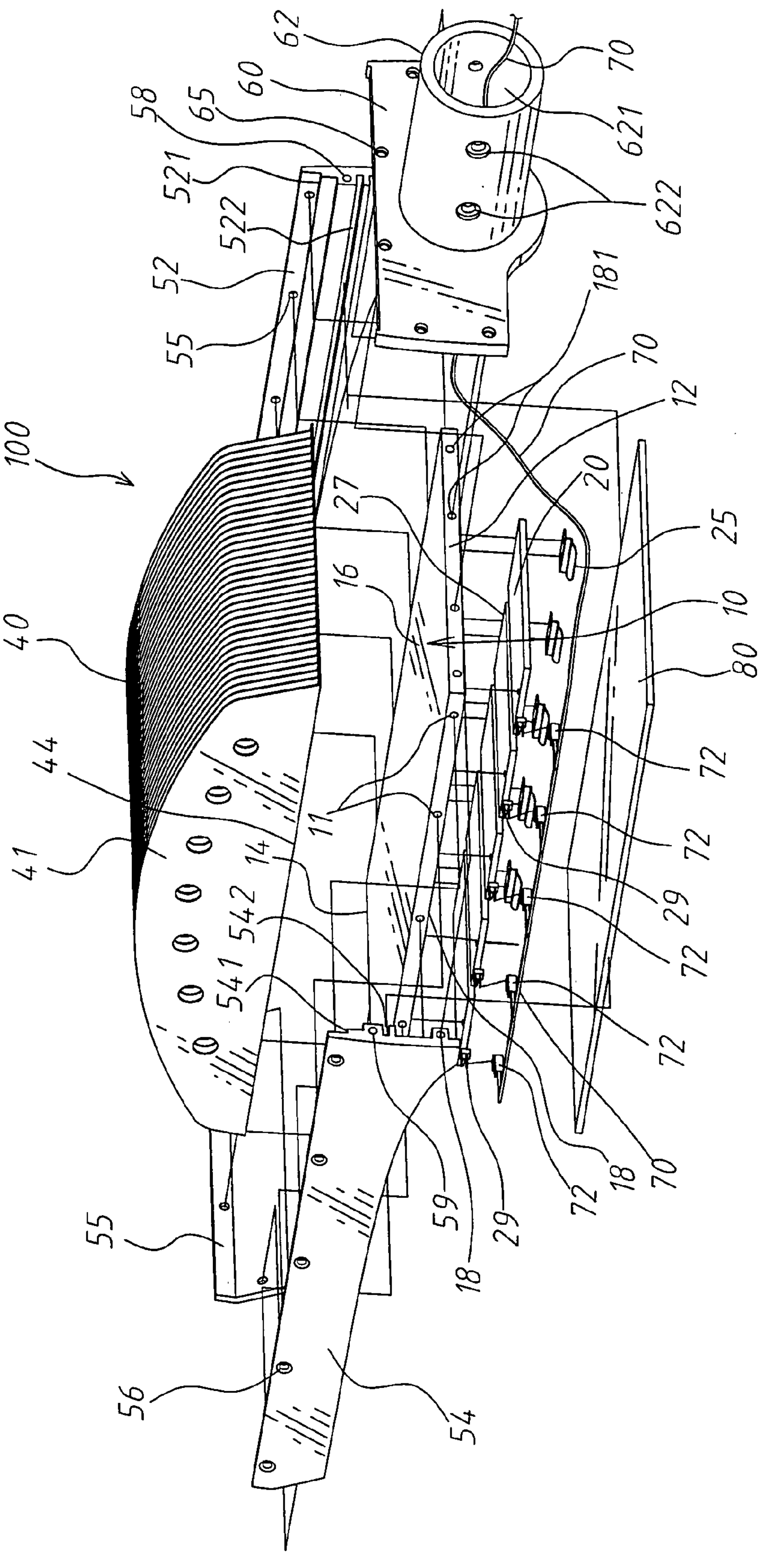
FIG. 1 shows a perspective view of parts of the present invention.
Figure 2:
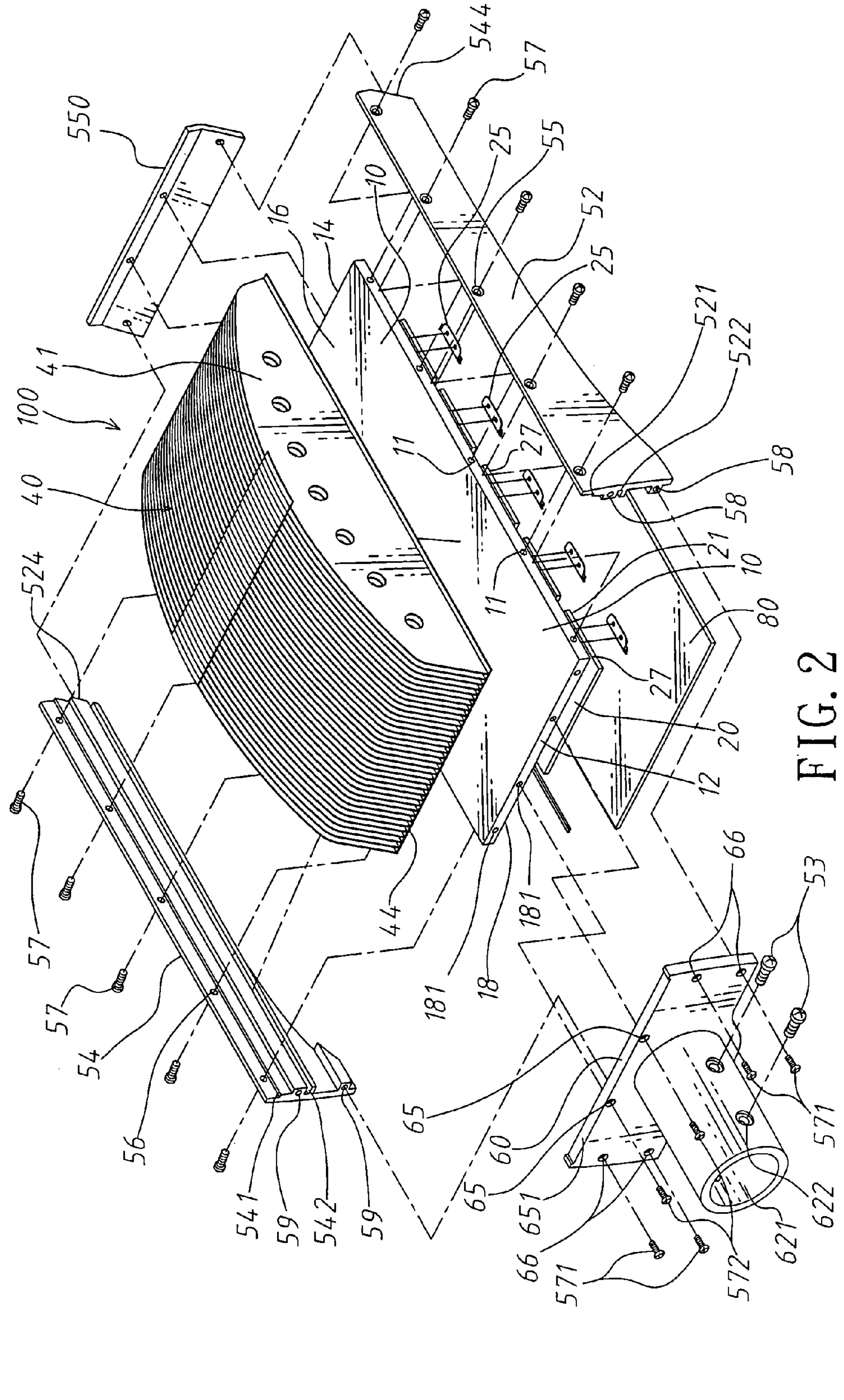
FIG. 2 shows an exploded view of parts of the present invention.
Figure 3:
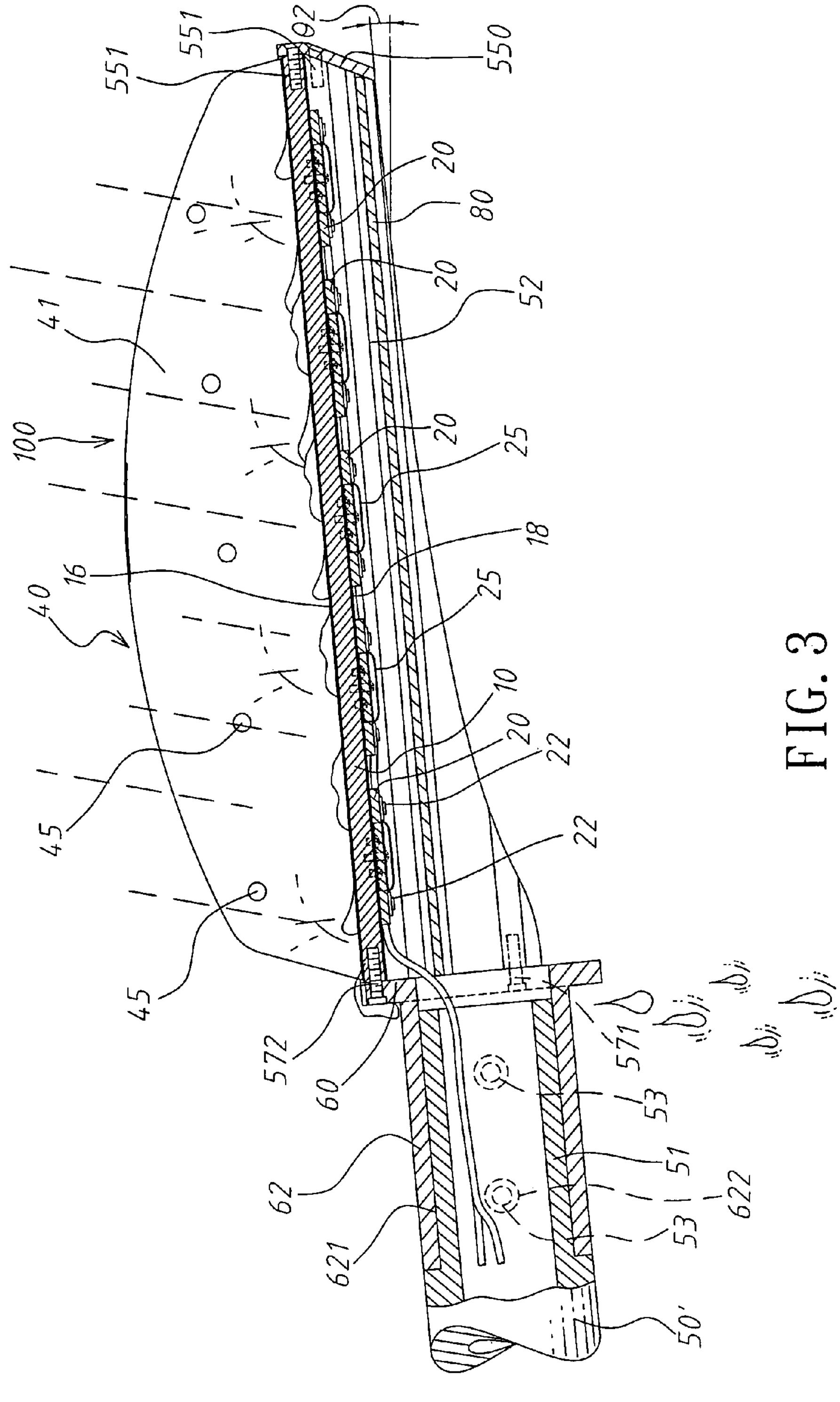
FIG. 3 shows a cross sectional view of the present invention.
Figure 9:
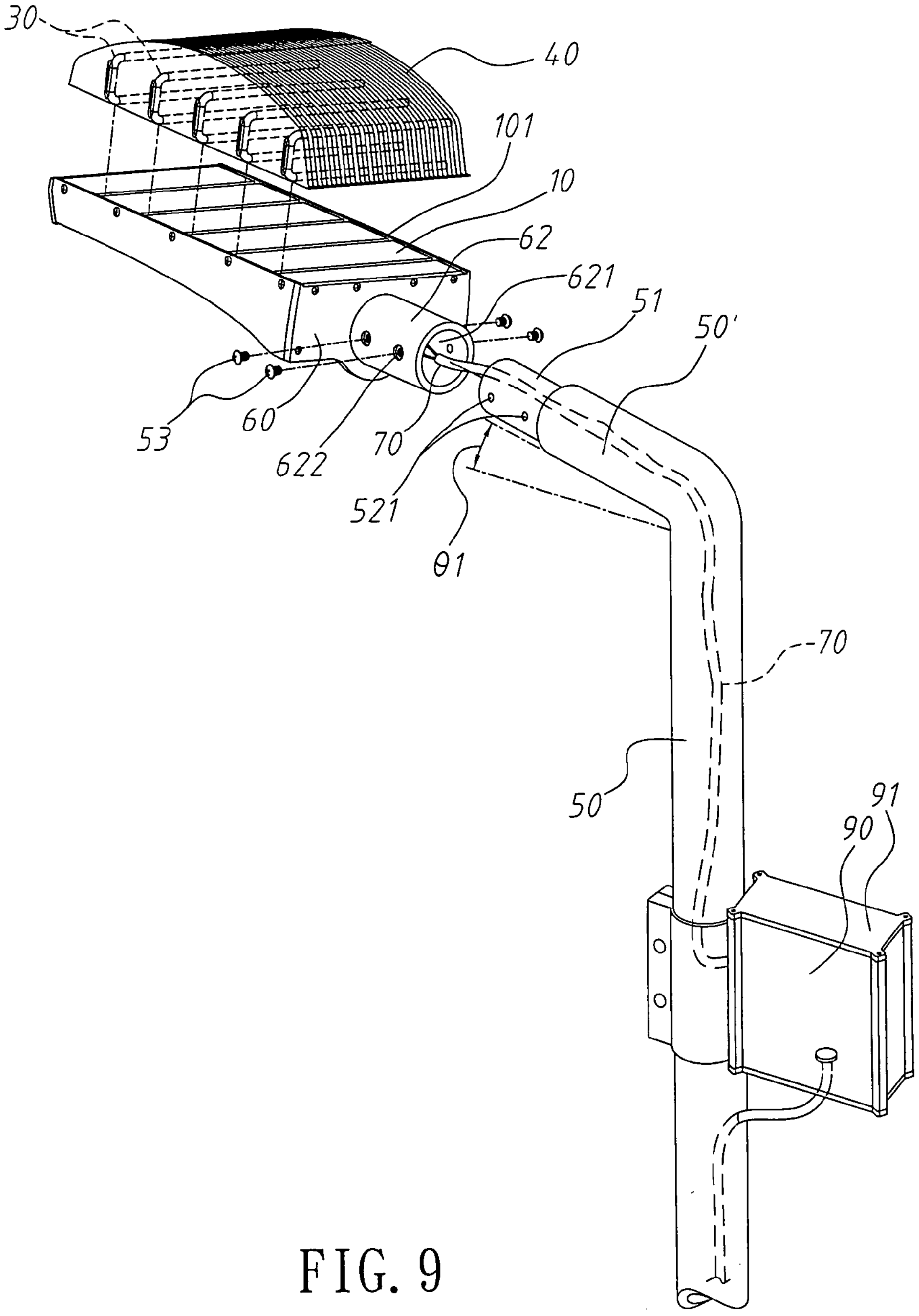
FIG. 9 shows an exploded view of the present invention wherein a lamp is connected with a stand pipe.

Referring to FIG. 1 and FIG. 2, the present invention is to provide an LED road lamp which includes a heat dissipater module 100 composed primarily of circuit boards 20, LED chips 22 (as shown in FIG. 3), and a cooling fin seat 40, to serve as a light emitting device of the LED road lamp, wherein the cooling fin seat 40 is directly exposed in and is directly in contact with atmosphere for cooling; and a sealed power supply 90 (as shown in FIG. 9) for supplying power to the circuit boards 20 and the LED chips 22.

Referring to FIG. 9, the completely sealed power supply 90 is fixed on a surface of a stand pipe 50, and supplies power to the circuit boards 20 (as shown in FIG. 1) through an electric wire 70.

Figure 11:
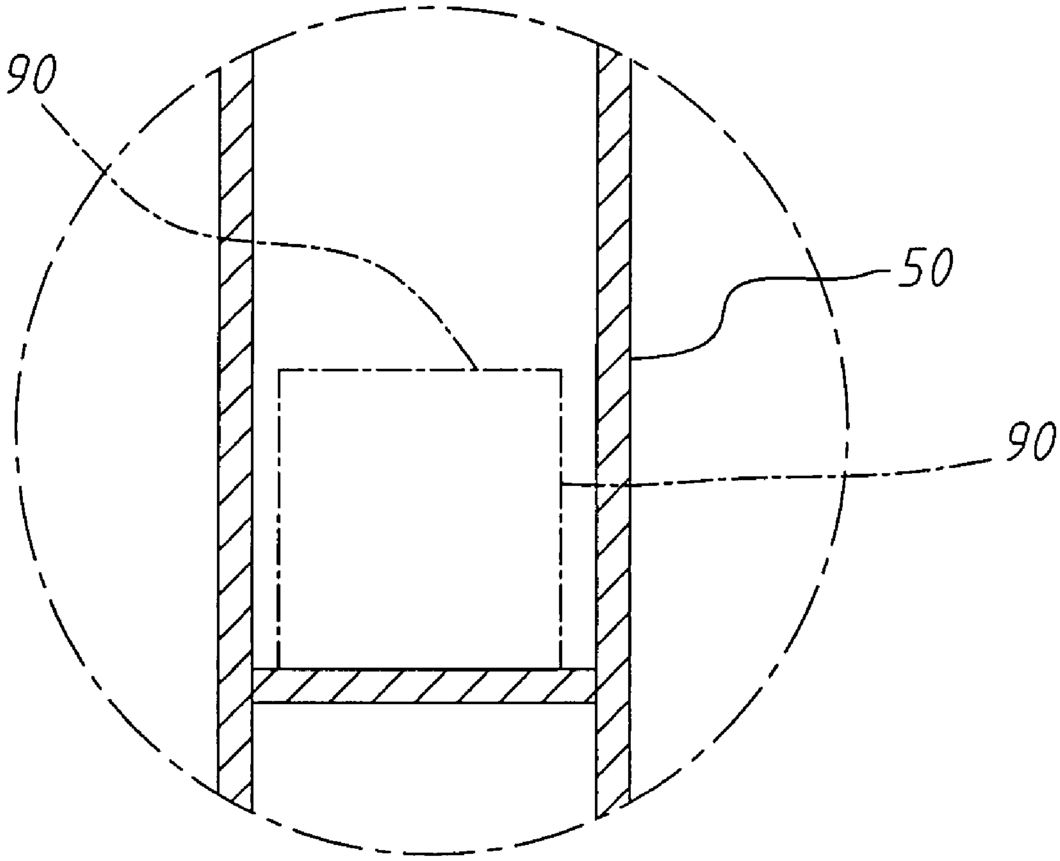
FIG. 11 shows a cross sectional view of the present invention wherein a power supply is installed inside a stand pipe.

Referring to FIG. 11, the completely sealed power supply 90 is fixed in a hollow stand pipe 50, and supplies power to the circuit boards 20 (as shown in FIG. 1) through an electric wire 70.

Figure 10:
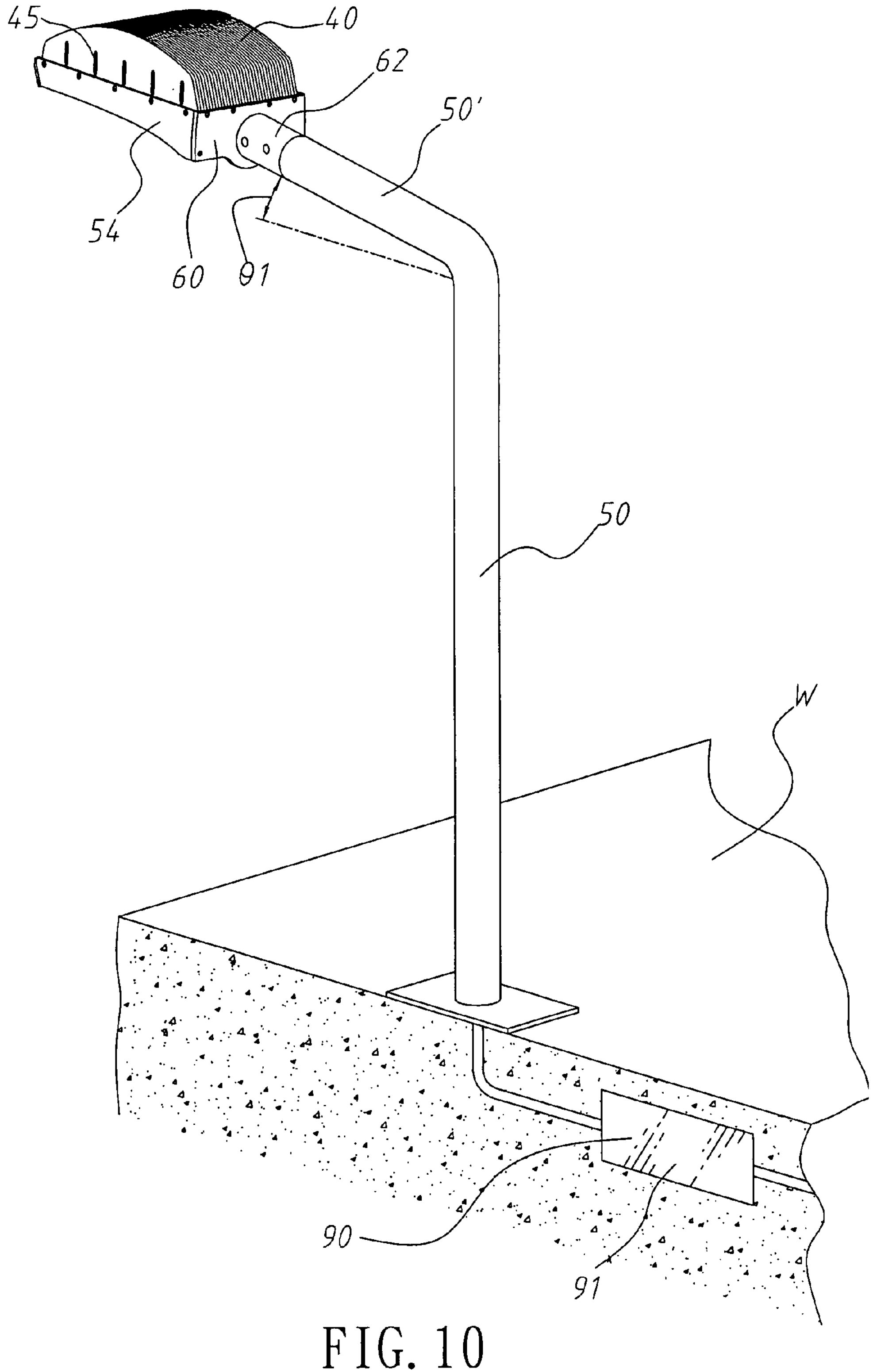
FIG. 10 shows a perspective view of the present invention wherein a lamp is connected a stand pipe.

Referring to FIG. 10, the completely sealed power supply 90 is pre-buried in a ground close to a bottom of a stand pipe 50, and supplies power to the circuit boards 20 (as shown in FIG. 1) through an electric wire 70.

Referring to FIG. 1 and FIG. 2, the heat dissipater module 100 further includes a cooling substrate 10, a front end 12 of which is fixed to a lamp fixing seat 60 that is connected to a transversal tube 50' (as shown in FIG. 9) at a top end of the stand pipe 50 through a tube connector 62; the cooling fin seat 40, which is formed by welding a plurality of fins 41 to form an outer cover of a road lamp, with a bottom part 44 of the cooling fin seat 40 being welded on an upper surface 16 of the cooling substrate 10; at least one circuit board 20, an outer surface 21 of which is welded with at least one LED chip 22, and which is fixed on a bottom board 18 of the cooling substrate 10 (as shown in FIG. 3); and a light-permeable lamp shade 80, which is installed below the circuit boards 20.

Left and right sides of the lamp fixing seat 60 are fixed respectively with a left wall 54 and a right wall 52 having a similar shape. Inner walls of the left and right walls 54, 52 are provided respectively with first positioning slots 521, 541, and second positioning slots 522, 542. Left and right sides of the cooling substrate 10 are locked respectively into the first positioning slots 521, 541.

Two sides of the lamp shade 80 are locked respectively into the second positioning slots 522, 542, and a front stopping sheet 550 is fixed at outer ends 524, 544 of the left and right walls 54, 52, and is fixed at a rear end 14 of the cooling substrate 10.

Figure 7:
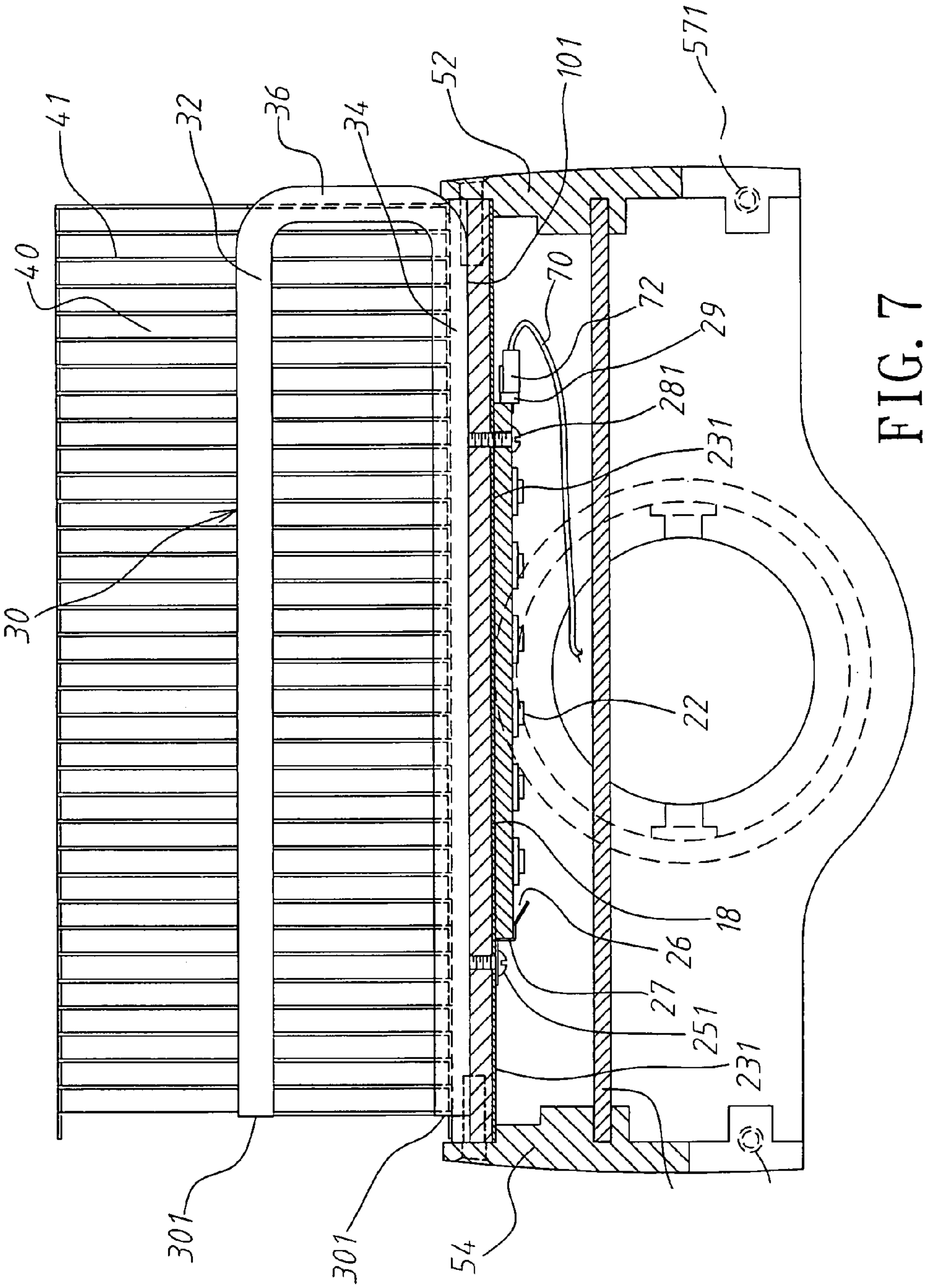
FIG. 7 shows a cross sectional view of the present invention which is installed with a U-shape heat pipe.
Figure 8:
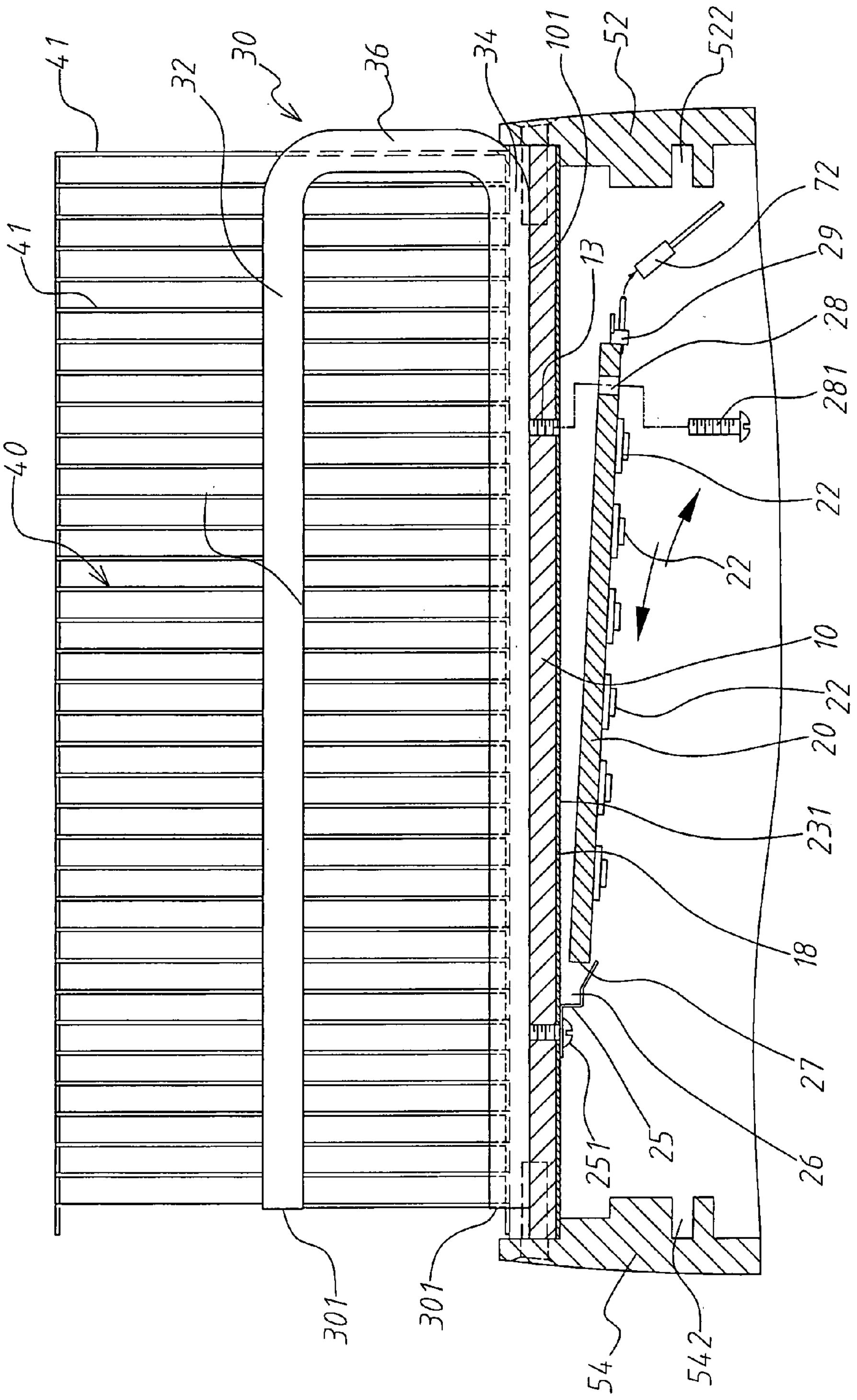
FIG. 8 shows a cross sectional view of an action for assembling and disassembling circuit boards of the present invention.

The bottom board 18 of the cooling substrate 10 is fixed with at least one fixing sheet 25, such that a locking slot 26 (as shown in FIG. 7 and FIG. 8) is formed between the fixing sheet 25 and the bottom board 18.

An inner side 27 of the circuit board 20 is locked into the locking slot 26, an outer end of the circuit board 20 is provided with a connection hole 28, and a bolt 281 is screwed into the connection hole 28 and a connection hole 13 of the cooling substrate 10.

Referring to FIG. 1, an outer end of the circuit board 20 is fixed with a connector A 29 for electric connection, and an electric wire 70 is connected with at least one connector B 72 which is inserted with the connector A 29 of the circuit board 20.

Referring to FIG. 9, a rear side of the lamp fixing seat 60 is connected with a tube connector 62. A hollow stand pipe 50 is used as an electric pole, a front end of which is bended with a transversal tube 50' which intersects with the stand pipe 50 by an included angle θ1 which is larger than 90°. A front end of the transversal tube 50' is provided with an inner tube connector 51 which can be transfixed into an interior of the tube connector 62, and the electric wire 70 is entered into an internal space of the stand pipe 50 from an internal space of the inner tube connector 51.

The inner surface 23 of the circuit board 20 is coated with a layer of heat conductive material 231 which is in contact with the bottom board 18 of the cooling substrate 10.

Figure 4:
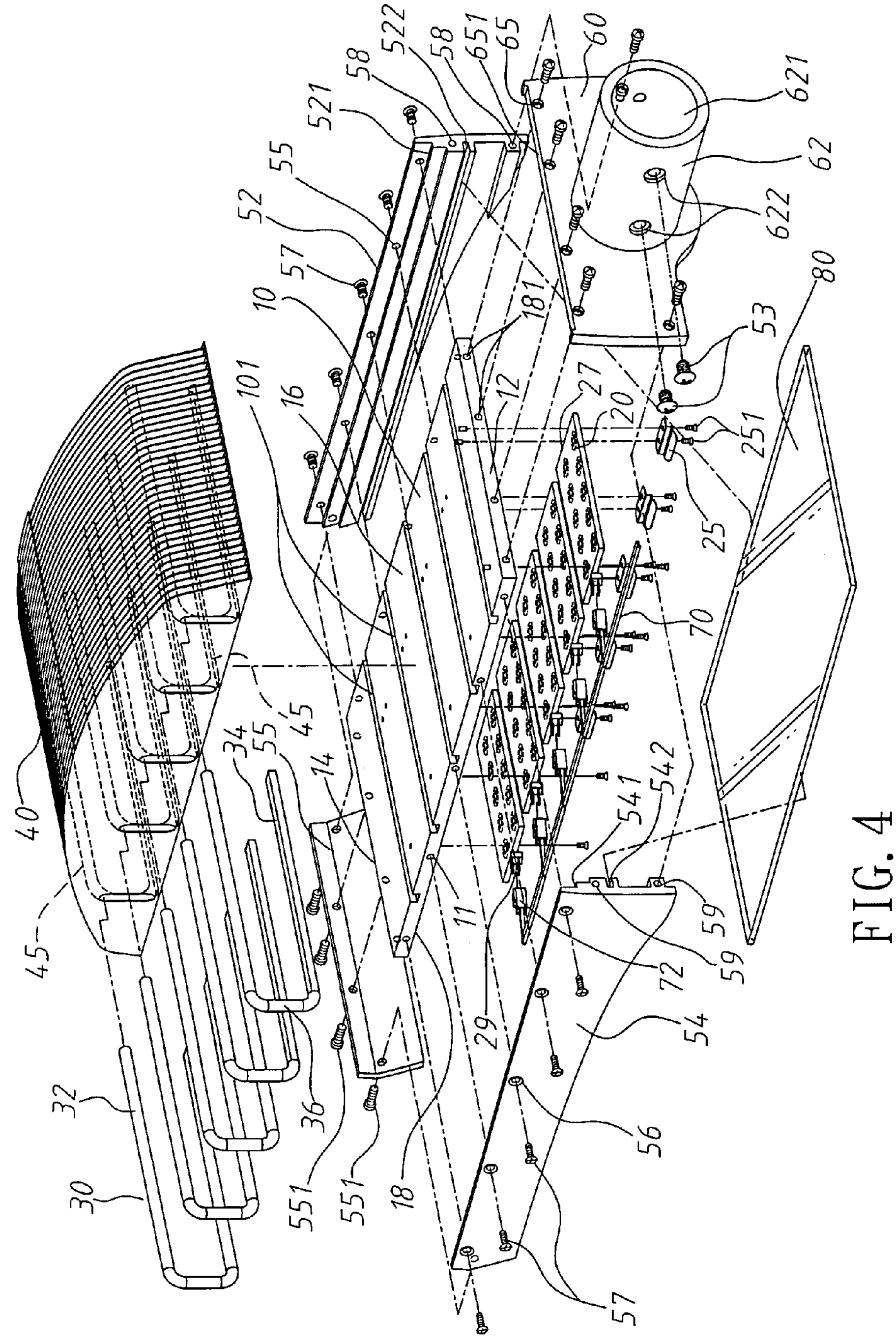
FIG. 4 shows an exploded view of parts of the present invention which is installed with a U-shape heat pipe.

Referring to FIG. 4, a surface of the cooling substrate 10 is provided with more than one groove 101, and a body of the cooling fin seat 40 is transversally opened with at least one through-hole 45. At least one U-shape heat pipe 30, with each U-shape heat pipe 30 being formed integrally by an upper straight tube 32, a lower straight tube 34, and a transversal tube 36, is transfixed into the cooling fin seat 40 by inserting the upper straight tube 32 into the through-hole 45 of the cooling fin seat 40, and tightly fitting the lower straight tube 34 into the groove 101 on the surface of the cooling substrate 101.

Referring to FIG. 7 and FIG. 8, two outer ends of a U-shape heat pipe 30 are a closed surface 301.

Referring to FIG. 9 and FIG. 10, a hollow stand pipe 50 is used as an electric pole, and a transversal tube 50' which is at a top end of the stand pipe 50 is bended with an angle, allowing the entire stand pipe 50 and the transversal tube 50' to form an L-shape body. The transversal tube 50' intersects with the vertical stand pipe 50 by an included angle θ1 which is larger than 90°, and a bottom end of the vertical stand pipe 50 fixed on a ground W. An entire set of heat dissipater module 100 which is fixed on the transversal tube 50' is shown in FIG. 3, wherein the heat dissipater module 100 intersects by an elevation angle θ2 with a horizontal line, a tube connector 62 is provided with a through-hole 621 and a screw-hole 622, and an inner tube connector 51, which is a round tube (as shown in FIG. 9), is located at an outer end of the transversal tube 50'. The inner tube connector 51 is inserted into the through-hole 621, and is also provided with a screw-hole 521. A bolt 53 is screwed into the screw-holes 622, 521, further allowing the entire set of heat dissipater module 100, a lamp fixing seat 60 and the tube connector 62 to be fixed on the inner tube connector 51.

If LED chips 22 of the present invention do not generate high heat from illumination, then there is no need to transfix a U-shape heat pipe to assist heat dissipation. Therefore, as shown in FIGS. 1 to 3, an upper surface 16 of a cooling substrate 10 is a plane, and a cooling fin seat 40 is formed by welding a plurality of fins 41 with a soldering material, with a groove of cooling space formed between every two neighboring fins 41 (41). A bottom part 44 of the cooling fin seat 40 is welded on the upper surface 16 of the cooling substrate 10, which is made by an aluminum alloy, with a soldering material, such that the cooling fin seat 40 and the cooling substrate 10 are assembled as one integral body. A front end 12 of the cooling substrate 10 is provided with a connection hole 181, and the lamp fixing seat 60 is provided with a connection hole 65. As shown in FIG. 2, a bolt 572 is screwed into the two connection holes 65, 181, allowing the cooling substrate 10 to be assembled with the lamp fixing seat 60 as one integral body. Two sides of the cooling substrate 10 are provided respectively with connection holes 11, a left wall and a right wall 54, 52 are provided respectively with connection holes 55, 56, and a plurality of bolts 57 are screwed into the connection holes 55, 56, 11 (as shown in FIG. 2), allowing the left and right sides of the cooling substrate 10 to be fixed respectively with the left and right walls 54, 52. Front ends of the left and right walls 54, 52 are provided respectively with connection holes 58, 59, left and right sides of the lamp fixing seat 60 are provided respectively with connection holes 66 (66), and a set of bolts 571 are screwed respectively into the connection holes 58, 59, 66 (66), allowing the left and right walls 54, 52 to be fixed on the lamp fixing seat 60.

Referring to FIG. 1, a plurality of connectors B 72 are serially connected on an electric wire 70, respectively. The connectors B 72 can be quickly assembled with or disassembled from connectors A 29, and the electric wire 70 passes through the through-hole 621, and is further entered into an interior space of the stand pipe 50 (as shown in FIG. 9). The electric wire 70 is connected with a power supply 90 which can be fixed on a surface of the stand pipe 50 (as shown in FIG. 9), or be pre-buried in a ground W (as shown in FIG. 10). If the stand pipe 50 is provided with a larger diameter, then the power supply 90 can be also fixed in an interior space of the stand pipe 50, as shown in FIG. 11.

Referring to FIG. 4 and FIG. 8, a fixing sheet 25 is fixed on a bottom surface of the cooling substrate 10 through a bolt 251, so as to form a locking slot 26.

Referring to FIG. 8, a circuit board 20 can be quickly assembled at or disassembled from a bottom board 18 of the cooling substrate 10. If the circuit board 20 needs to be replaced, the circuit board 20 can be displaced and taken out of the locking slot 26, by only pulling the connector B 72 out of the connector A 29, and then taking out the bolt 281. Referring to FIG. 8, if the circuit board 20 is to be assembled at the bottom board 18 of the cooling base 10, an inner side 27 of the circuit board 20 is first locked into the locking slot 26, then the bolt 281 is locked into the connection holes 28, 13 to fix the circuit board 20 at the bottom board 18, and next the connector B 72 is inserted into the connector A 29, thus allowing the circuit board 20 to be energized by power. The bottom board 18 of the cooling substrate 10 is attached with a layer of heat conductive material 231. As the heat conductive material 231 is non-viscous, the circuit board 20 will not be adhered to the bottom board 18, but only that heat generated by the circuit board 20 can be quickly transmitted to the cooling substrate 10 through a heat conduction function of the heat conductive material 231. The heat absorbed by the cooling substrate 10 is dissipated through the cooling fin seat 40 from atmosphere, which provides a better effect of heat dissipation, and further increases a lifetime of usage of the LED chips 20. As shown in FIG. 3, the cooling substrate 10 is connected with the left and right walls 54, 52 of the lamp fixing seat 60 as well as a front stopping sheet 550; therefore, the heat absorbed by the cooling substrate 10 can be dissipated through the lamp fixing seat 60, the left and right walls 54, 52, and the front stopping sheet 550 (as shown in FIG. 1 and FIG. 3). More particularly, the lamp fixing seat 60 is connected to the transversal tube 50', and hence the heat absorbed by the lamp fixing seat 60 can be conducted to the transversal tube 50', and through the transversal tube 50' to the stand pipe 50 (as shown in FIG. 10), thereby achieving a further heat dissipation effect.

Referring to FIG. 3, as the entire set of heat dissipater module 100 intersects with a horizontal line by an elevation angle θ2, when raining, water will flow through grooves 101 of the cooling fin seat 40 and to a rear side, and drain out downward from a rear surface of the lamp fixing seat 60. As the cooling fin seat 40 and the cooling substrate 10 are all treated by a special corrosion-proof process (anti-acid and anti-base), the cooling fin seat 40 and the cooling substrate 10 are all provided with a highly anti-acid and anti-base function, to prevent from material corrosion. Accordingly, the cooling fin seat 40 of the present invention can not only replace an outer cover of a conventional road lamp, but also form a cooler. In a mean time, the flow of water can wash off dusts in the grooves 101 of the cooling fin seat 40.

Referring to FIG. 4, to further increase the heat dissipation effect, a U-shape heat pipe 30 is optionally transfixed into the cooling fin seat 40, with a lower straight pipe 34 being tightly fitted into the grooves 101. Therefore, the heat absorbed by the cooling base 10 is transmitted to the entire U-shape heat pipe 30 through the lower straight pipe 34, and then transmitted to the cooling fin seat 40 to be dissipated in atmosphere, which enables an even better effect of heat dissipation.

Figure 5:
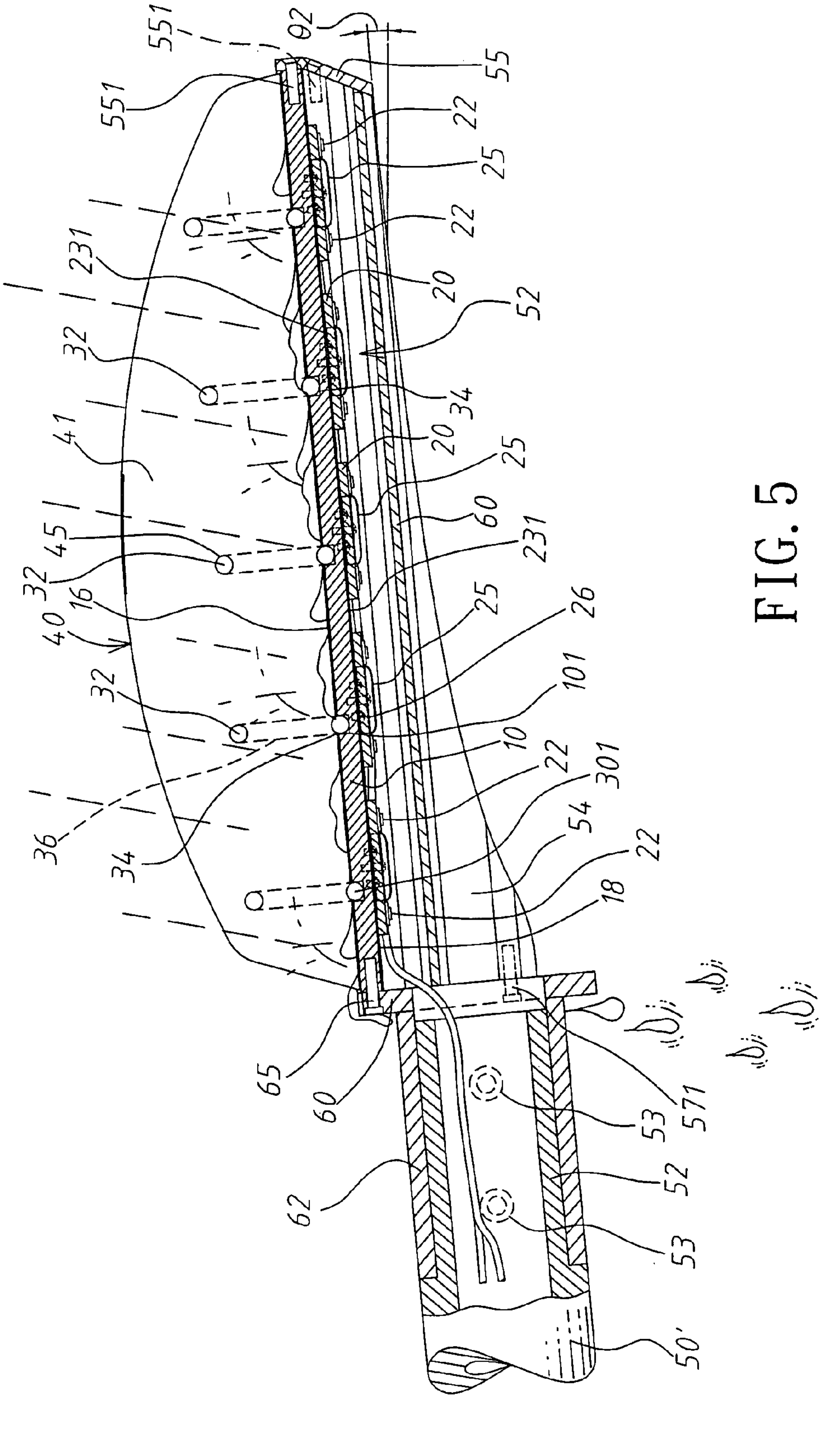
FIG. 5 shows a cross sectional view of parts of the present invention which is installed with a U-shape heat pipe.
Figure 6:
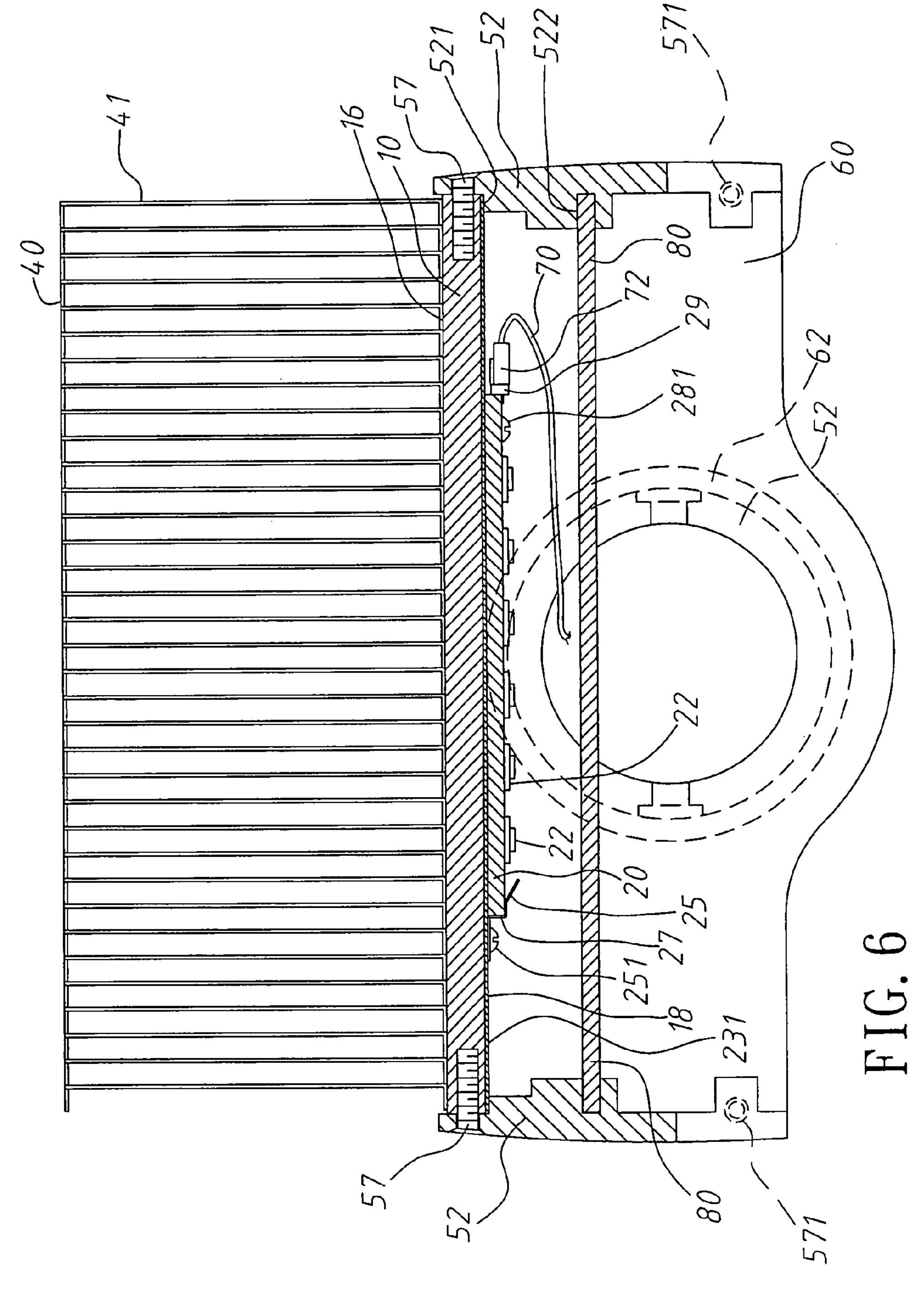
FIG. 6 shows another cross sectional view of the present invention.

Referring to FIG. 4 and FIG. 5, the front stopping sheet 550 is screwed respectively at a rear end 14 of the cooling substrate 10, and into the connection holes 58, 59 of the left and right walls 54, 52, by the plurality of bolts 551. When a lamp shade 80 needs to be removed, the front stopping sheet 550 must be removed first, and then the lamp shade 80 can be taken out from a second positioning slot 522.

Referring to FIG. 9, the power supply 90 is designed as a sealed state, to isolate moisture and rain from intruding into the power supply 90. More particularly, an outer casing 91 of the power supply 90 is made by an aluminum alloy or other heat dissipation material, and is provided with a cooling effect. Heating elements (not shown in the drawing) in the power supply 90 can thermally conduct with an inner wall of the outer casing 91 of the power supply 90, through heat conductive elements (not shown in the drawing), enabling the outer casing 91 of the power supply 90 to be also provided with a cooling function.

What is claimed is:

1. An LED road lamp, comprising a heat dissipation module composed of circuit boards, LED chips and a cooling fin seat, to serve as a light emitting device of the LED road lamp, wherein the cooling fin seat is directly exposed in and is directly in contact with atmosphere for cooling; and a sealed power supply which supplies power to the circuit boards and the LED chips, wherein the heat dissipater module further includes a cooling substrate as a center, a front end of which is fixed at a lamp fixing seat that is connected to a transversal tube at a top end of a stand pipe through a tube connector;

the cooling fin seat which is formed by welding a plurality of fins, to form an outer cover of the road lamp, with a bottom part of the cooling fin seat being welded on an upper surface of the cooling substrate;

at least one outer surface of the circuit board, is welded with at least one LED chip, and which is fixed on a bottom board of the cooling substrate; and a light-permeable lamp shade which is installed below the circuit boards.

2. The LED road lamp according to claim 1, wherein the completely sealed power supply is fixed at a proper position of the entire road lamp, and provides power to the circuit boards through an electric wire.

3. The LED road lamp according to claim 1, wherein the completely sealed power supply is fixed in an interior of a hollow stand pipe, and provides power to the circuit boards through an electric wire.

4. The LED road lamp according to claim 1, wherein the completely sealed power supply is pre-buried in a ground close to a bottom of a stand pipe, and provides power to the circuit boards through an electric wire.

5. The LED road lamp according to claim 1, wherein left and right sides of the lamp fixing seat are fixed respectively with a left wall and a right wall with a similar shape effectively bounding the left and right sides of the LED road lamp, inner walls of the left and right walls are provided respectively with first positioning slots and second positioning slots, with left and right sides of the cooling substrate being locked and fixed respectively into the first positioning slots, and with two sides of the lamp shade being locked and fixed respectively into the second positioning slots; a front stopping sheet being fixed at an outer end of the left and right walls, and being fixed at a rear end of the cooling substrate.

6. The LED road lamp according to claim 1, wherein the bottom board of the cooling substrate is fixed with at least one fixing sheet, to form a locking slot between the fixing sheet and the bottom board; an inner side of each of the circuit boards being locked into the locking slot, an outer end of each of the circuit boards being provided with a connection hole, and a bolt being connected into the connection hole, and a connection hole of the cooling substrate.

7. The LED road lamp according to claim 1, wherein an outer end of each of the circuit boards is fixed with a connector A for electrical insertion; the electric wire being connected with at least one connector B which is inserted with the connector A of the circuit board.

8. The LED road lamp according to claim 1, wherein a rear side of the lamp fixing seat is connected with a tube connector; a hollow stand pipe being used as an electric pole, a front end of which being bended with a transversal tube intersecting with the stand pipe by an included angle 1 which is larger than 90; a front end of the transversal tube being provided with an inner tube connector which is transfixed into the tube connector, and the electric wire being entered into an interior space of the stand pipe from an interior space of the inner tube connector.

9. The LED road lamp according to claim 1, wherein an inner surface of each of the circuit boards is coated with a layer of heat conductive material which is in contact with the bottom board of the cooling substrate.

10. The LED road lamp according to claim 1, wherein a surface of the cooling substrate is provided with more than one groove; a body of the cooling fin seat being transversally opened with at least one through-hole; at least one U-shape heat pipe, each U-shape heat pipe being formed integrally by an upper straight tube, a lower straight tube, and a transversal tube, with the upper straight tube being inserted into the through-hole of the cooling fin seat, and with the lower straight tube being tightly fitted into the groove on the surface of the cooling substrate.

11. The LED road lamp according to claim 10, wherein two outer ends of the U-shape heat pipe are a closed surface.

12. An LED road lamp, comprising a heat dissipation module composed of circuit boards, LED chips and a cooling fin seat, to serve as a light emitting device of the LED road lamp, wherein the cooling fin seat is directly exposed in and is directly in contact with atmosphere for cooling; and a sealed power supply which supplies power to the circuit boards and the LED chips, wherein the completely sealed power supply is fixed in an interior of a hollow stand pipe, and provides power to the circuit boards through an electric wire.

* * * * *